SUBMICRON FERROMAGNETIC ALLOY PARTICLES CONTAINING COBALT, BORON, AND ZINC
Filed Dec. 7, 1970
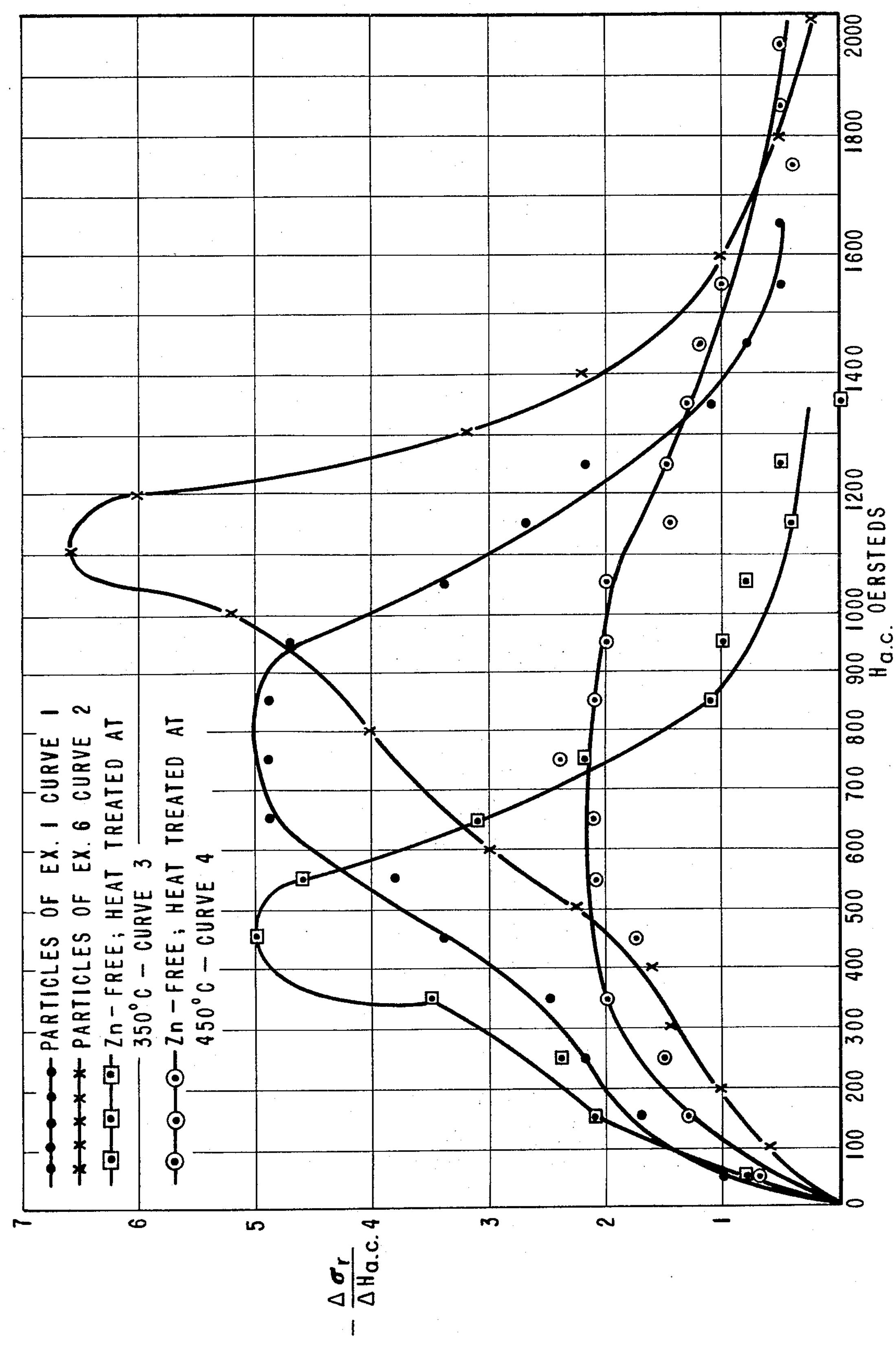

United States Patent Office 3,672,867

Patented June 27, 1972

3,672,867

SUBMICRON FERROMAGNETIC ALLOY PARTICLES CONTAINING COBALT, BORON, AND ZINC

Ernest Lewis Little, Jr., Wilmington, Del., assignor to E. I. du Pont de Nemours and Company, Wilmington, Del.

Filed Dec. 7, 1970, Ser. No. 95,836
Int. Cl. H01f *1/08, 1/20;* C22c *19/00*
U.S. Cl. 75—.5 AA 17 Claims

ABSTRACT OF THE DISCLOSURE

Submicron particles, useful in magnetic applications, consisting essentially of cobalt, zinc, and boron in 70–92 to 1–8 to 1–5.6 weight ratio and up to 22 percent by weight water and oxygen, are prepared by reducing $Co^{2+}$ in solutions containing $Zn^{2+}$ by means of selected borohydrides and preferably heat-treating the products in hydrogen. After heat treatment substantial quantities of hexagonal close-packed cobalt may be detected by X-ray diffraction. The particles are useful in a variety of magnetic applications, e.g., in magnetic recording tapes, in bar magnets and the like.

BACKGROUND OF THE INVENTION

Field of the invention

This invention relates to new ferromagnetic, submicron particles of cobalt, zinc, and boron and to their preparation.

Description of the prior art

Cobalt is an important ingredient of magnetic alloys though alone it has not achieved a position of importance in permanent magnets and in other magnetic applications. This is due in part to difficulty in obtaining the metal in finely divided form and in part to the tendency of finely divded cobalt to exist in face-heightened cubic (fcc) crystal form rather than in hexagonal close-packed (hcp) crystal form. Only hcp cobalt possesses sufficient magnetocrystalline anisotropy for high coercivity.

M. McCaig, Cobalt 31, 83 (1966), calculated that perfectly aligned and perfectly packed single domain particles of hcp cobalt would have an extraordinarily high energy product, $(BH)_{max.}$, of $66.5\times10^6$ gauss oersteds. Using a formula of Went et al. from Philips Tech. Rev. 13, 194 (1952), McCaig also calculated that a particle size of less than about 0.2 micron was necessary for single magnetic domain behavior at room temperature.

Single domain particles are especially useful in the fabrication of permanent magnets since magnetization and demagnetization require the rotation of the magnetization vector of each particle rather than the much easier process of simply moving domain boundaries.

The hexagonal close-packed (hcp or $\alpha$) crystal modification of cobalt is the form expected to be stable at room temperature. This is true of massive cobalt which transforms reversibly from hcp to face-centered cubic (fcc or $\beta$) form at 420° C. Finely divided cobalt, however, behaves quite differently. Several investigators have reported fruitless attempts to prepare single domain particles of hcp cobalt. Thus, O. L. Harle and J. R. Thomas, U.S. Pat. 3,228,882 prepared encapsulated single domain particles of cobalt by thermal decomposition of dicobalt octacarbonyl in polymer solutions, but as reported by J. R. Thomas in a subsequent publication, J. Appl. Phys. 37, 2914 (1966), the particles had the fcc crystal configuration. Yu. I. Petrov, Soviet Physics-Crystallography, vol. II, p. 788 (1967) likewise obtained cobalt in single domain size by condensing vapors of the metal in argon, but the fcc crystal form persisted, with no sign of the hcp polymorph, despite repeated thermal cycling to 860° C. and cooling. P. A. Lavin, Cobalt 43, 87 (1969), found only extremely faint reflections of hcp cobalt in powders prepared by somewhat similar technique, and he likewise was unable to change the fcc to hcp form.

Stadelmaier et al., Metall. 17, 781–782 (1963), describe a Co-Zn-B system in bulk form. They prepared alloys by heating the components to about 800° C. and then determined the various crystalline structures. Neither the submicron particles, their magnetic properties, nor the effect of zinc taught by this application are mentioned.

Production of metal powders by reduction of dissolved salts with $BH_4^-$ or amine-borane/$BH_4^-$ is described in a patent and in several copending patent applications of the assignee. Miller and Oppegard, U.S. Pat. 3,206,338, prepared acicular, 0.05–4$\times$0.01–0.1 micron particles consisting of boron, oxygen and iron and of boron, oxygen, iron, cobalt and/or nickel by $BH_4^-$ reduction of dissolved salts in a magnetic field. Little and Wolf, U.S. Pa. 3,535,104 introduced up to 20% by weight of chromium into Miller and Oppegard's products by precipitating the powders with $BH_4^-$ in the presence of chromium salts.

In assignee's copending application S.N. 739,732, filed June 25, 1968 and now Pat. No. 3,567,525, Graham, Little, and Wolf describe the preparation of polyphase, nonpyrophoric particles, having a maximum dimension of about 4 microns, consisting of at least one of iron, cobalt, and nickel, 0–20% chromium, and at least one of boron, nitrogen, or phosphorus in an amount less than the minimum amount required to form a compound with all of said metal.

Assignee's copending application, Ser. No. 78,182, filed Oct. 5, 1970, Little and Wolf, entitled "Process For Making Ferromagnetic Metal Powders" relates to reduction of a salt or salts of iron, cobalt, or nickel and 0–20% chromium by means of an amine-borane containing at most about 20% of an alkali metal borohydride based on the weight of the amine-borane.

In another copending application of the assignee, Jolley and Little, Ser. No. 803,985, filed Mar. 3, 1969, describe the preparation by borohydride reduction of equiaxed particles averaging about 0.04 micron in size and consisting of 75–77% Co, 7–7.6% B, combined oxygen, and adsorbed water.

Reduction of metal salts with amine-boranes and/or $BH_4^-$ invariably results in presence of boron in the precipitated metals. Minimum boron content is highly desirable in ferromagnetic cobalt powders since (1) boron promotes transformation of hcp cobalt to fcc cobalt (H. Winterhager and J. Kruger, Cobalt 29, 187 (1965)), (2) boron is non-magnetic and thus reduces saturation magnetization, and (3) as little as 5.77 g. of boron is theoretically capable of converting 94.239 g. of cobalt into nonmagnetic $Co_3B$ at the heat treating temperatures required to impart optimum properties to borohydride precipitated cobalt powders.

DETAILS OF THE INVENTION

It has now been discovered that new zinc-containing cobalt-boron ferromagnetic alloy particles and methods of preparing them oxer a number of advantages over previously known products and processes. These cobalt-zinc-boron compositions exhibit superior and unusually uniform magnetic properties, e.g., unusually high coercivity, submicron particle size, unusually low boron content, and, especially after heat treatment, substantial proportions of cobalt in hexagonal close-packed crystal form. These improvements result principally from precipitating cobalt from solutions of its salts in the presence of zinc salts by means of selected boron compounds. Superior products have been obtained by employing a special type of reactor, designated hereinafter as a "merging stream" reactor, in which precipitation is effected under constant environment conditions. It is a feature of the invention that the presence of zinc during precipitation results in Zn-containing products of lower boron content and improved magnetic properties as compared with precipitation of cobalt-boron particles in the absence of zinc.

The alloy compositions of this invention are ferromagnetic, approximately equiaxed particles about 0.01 to 0.1 micron in size that consist essentially of cobalt, zinc and boron in 70–92 to 1–8 to 1–5.6 weight ratio and up to 22% by weight combined oxygen and adsorbed water, substantial proportions of the cobalt being in the hexagonal close-packed crystal form. By "substantial proportions of the cobalt being in the hexagonal close-packed crystal form" is meant at least 60% as determined by the relative intensity of the integrated X-ray intensity of the $\{10\bar{1}1\}$ hcp cobalt diffraction peak to the sum of the integrated intensity of the $\{10\bar{1}1\}$ hcp cobalt peak plus 1.5 times the integrated intensity of the {200} fcc cobalt peak. By "approximately equiaxed" is meant particles that have dimensions within the range 0.01–0.1 micron in all three directions. It is believed that many of the particles of the invention consist of single magnetic domains since the particle dimensions are in the single domain size range.

The compositions of the invention can be produced by reacting a mixture of cobaltous and zinc salts with a reducing agent selected from the group (a) Group I–A metal borohydrides,
(b) Group II–A metal borohydrides,
(c) tetraloweralkylammonium borohydrides, and
(d) a mixture of an amine-borane with up to 20% by weight of (a), (b) or (c), and recovering the formed ferromagnetic particles. For example a solution containing at least one cobaltous salt and at least one zinc salt can be reduced by adding thereto a solution of the reducing agent to precipitate ferromagnetic cobalt-zinc-boron particles containing oxygen and water. The separated precipitate can be aged in acetone for about 10 hours or more to lessen oxygen sensitivity. Before or after such aging the particles are preferably heat treated for several hours, for example in hydrogen, at 250–400° C., more preferably at 300–325° C., for a time sufficient, as for example 4 hours, to convert at least 60% of the cobalt into hexagonal close-packed crystal form which may be recognized by its X-ray diffraction pattern. The heat treatment brings about an increase in coercivity, saturation magnetization, remanence and remanence ratio. The heat treated particles can then be converted to non-pyrophoric form by exposing them to an inert gas, e.g. argon or nitrogen, containing 1–3% of oxygen for several hours.

Borohydride and amine-borane/borohydride reduction of $Co^{2+}$ in the presence of $Zn^{2+}$ are preferably effected in a "merging stream" reactor, thereby achieving more uniform and generally superior magnetic properties as contrasted to batch-precipitation. A "merging stream" reactor is one in which $Co^{2+}/Zn^{2+}$ solution is placed in one vessel and $BH_4^-$ solution in another, and the two solutions are forced at controlled rate through separate small diameter tubes arranged close to but at a slight angle to each other so that the two streams impinge forcibly and mix. Reaction takes place upon mixing, and the slurry of product then falls through a larger surrounding tube into a receiver located about one to two feet below the point of impingement. Optionally, a solenoid or gap of a permanent magnet may be located at and immediately below the point of impingement, though this has been of questionable value with fields of up to 2000 oersteds since it has resulted in little chaining of particles into acicular aggregates.

Presence of $Zn^{2+}$ during the reduction of $Co^{2+}$ is an essential part of this invention though the mechanism by which the zinc lowers the boron content and improves the magnetic properties is not completely understood.

It is preferred to use zinc chloride as the source of zinc. However, other zinc salts which are soluble in water or in water-miscible organic liquids may be used, especially when reaction is effected in a "merging stream" reactor. The proportion of zinc salt to cobalt salt is not critical and can be varied widely, e.g., from about 2% to 21% or more by weight of the cobalt salt. Use of more than about 2–4% by weight of zinc salt, however, usually has no further effect in reducing the boron content of the precipitated particles nor does it increase the zinc content of the particles appreciably. Zinc salts are not reduced by $BH_4^-$ in the absence of $Co^{2+}$.

There is a specific anion effect in batch precipitations which has not been observed in "merging stream" precipitations. Thus, batch-precipitated cobalt powders with coercivity above 300 oe. in the "as chemically precipitated" condition were obtained using combinations of $CoCl_2 \cdot 6H_2O$ with the chloride, bromide, fluoride or sulfate or zinc. In contrast, batch precipitations gave relatively unattractive products of low coercivity when combinations of $$CoSO_4 \cdot 7H_2O + ZnCl_2$$

$$Co(C_2H_3O_2)_2 \cdot 4H_2O + ZnCl_2$$

$$CoCl_2 \cdot 6H_2O + Zn(C_2H_3O_2)_2$$

$$CoSO_4 \cdot 7H_2O + ZnSO_4 \cdot 7H_2O$$

$$Co(C_2H_3O_2)_2 \cdot 4H_2O + Zn(C_2H_3O_2)_2$$

$$CoCl_2 \cdot 6H_2O + ZnI_2$$

$$CoCl_2 \cdot 6H_2O + Zn(BrO_3)_2 \cdot 6H_2O$$

or $$CoCl_2 \cdot 6H_2O + Zn(NO_3)_2 \cdot 6H_2O$$

were used. However, while the $CoSO_4 \cdot 7H_2O + ZnCl_2$ system gave products of relatively low coercivity in batch precipitations, it gave excellent results in the "merging stream" reactor—see Example 8.

A variety of metal borohydrides such as the borohydrides of alkali metals of Group I–A and the alkaline earth metals of Group II–A may be employed as reductive precipitants though sodium and potassium borohydride, $NaBH_4$ and $KBH_4$, are preferred because of their ready availability and relatively low cost. Other useful borohydrides include lithium borohydride, magnesium borohydride, calcium borohydride, and tetraloweralkylammonium borohydrides in which the alkyl group has up to six carbon atoms, e.g. tetramethylammonium borohydride, tetraethylammonium borohydride, etc.

When amide-boranes are employed. it is desirable, as described in assignee's aforementioned application Ser. No. 78,182 to promote or "trigger" them by adding up to 20% of their weight of one or more of the previously named borohydrides. The amine-borane can be present in the solution containing the "triggering" quantity of $BH_4^-$, or it can be present in the solution of either or both of the cobalt and zinc salts in which case the "triggering" quantity of $NaBH_4$ is added. In general, any soluble amine-borane can be used. Amine-boranes are a known class or compounds in which the nitrogen of an organic amine is coordinately bonded to a $BH_3$ moiety, as, for example, in dimethylamine-borane, $(CH_3)_2NH \cdot BH_3$. The amine portion of the amine-borane can be a primary, secondary, or tertiary amine. It can be aliphatic, aromatic, or heterocyclic, or it can have more than one of these characteristics. It can be a nonamine, a diamine, or a polyamine.

Because of availability and stability, amine-boranes derived from secondary and tertiary amines are preferred.

Examples of operable amine-boranes are methylamine-borane
ethylamine-borane
isopropylamine-borane
t-butylamine-borane
cyclohtexylamine-borane
aniline-borane
p-toluidine-borane
m-anisidine-borane
p-chloroaniline-borane
p-bromoaniline-borane
diethylamine-borane
morpholine-borane
di-t-butylamine-borane
diisopropylamine-borane
dipropylamine-borane
diisopentylamine-borane
dibutylamine-borane
piperidine-borane
pyridine-borane
N,N-dimethylcyclohexylamine-borane
dimethyloctadecylamine-borane
N,N,N′,N′-tetramethylenediamine-bisborane
triethylamine-borane
N-methylmorpholine-borane
dimethylethylamine-borane
N,N-dibutylcyclohexylamine-borane
diethylbutylamine-borane
N,N-diethylcyclohexylamine-borane
N,N-dimethylaniline-borane
N,N-dimethyl-p-toluidine-borane Cobalt-zinc-boron powders precipitated from cobalt chloride/zinc chloride solution with amine-boranes "triggered" with small quantities of $NaBH_4$ generally contain less combined oxygen and adsorbed water and less boron and zinc than similar powders precipitated with $BH_4^-$. These compositions consist essentially of cobalt, zinc and boron in 87–92 to 1–1.5 to 1–4 weight ratio with the balance bzeing chemically combined oxygen and adsorbed water. The lower boron content is especially desirable since the products have a correspondingly higher content of magnetic material and less tendency to change to fcc-cobalt on heating.

The proportions in which borohydrides and amine-boranes are added to cobalt-zinc solution is not critical. Normally one mole of reductant is used with two moles of the metal salts.

As shown in Examples 6 and 10, heat treatment in hydrogen at temperatures of about 350° C. or above can result in partial sintering and in the formation of the magnetically less desirable fcc crystal form of cobalt as a principal phase in addition to the hcp phase. Consequently lower heat treating temperatures of about 300–325° C. are preferred. Heat treatment in a reducing atmosphere such as hydrogen usually results in elimination of adsorbed water and formation of water by chemical reduction or decomposition of metal hydroxides. It also raises the weight percent of the cobalt, zinc and boron in the products, leaving their relative proportions unchanged. Heat treated products are preferably passivated, that is, rendered less sensitive to the effects of atmospheric oxygen, by exposing them for several hours, e.g., overnight, to a stream of inert gas, e.g., argon or nitrogen, containing about 1–3% oxygen of air to form a thin oxide film. Optionally, but less desirably, heat treatment can also be affected in chemically inert gases such as nitrogen and argon.

Compositions of the invention are usually precipitated at ordinary temperature and at atmospheric pressure though temperatures up to about 45–60° C. and pressures of 0.5 atmosphere to 5 atmospheres or more can be used. The useful temperature range is limited by thermal instability, i.e., the desirability of avoiding aqueous hydrolysis of borohydrides and amine-boranes and reaction between the precipitated particles and reaction media. Equipment requirements are less stringent at atmospheric pressure than at higher or lower pressures.

Although water is a convenient and readily available reaction medium, it will be appreciated that cobalt and zinc salts, borohydrides, and amine-boranes are soluble in other media, particularly aqueous solutions of water-miscible organic liquids such as methanol, ethanol, acetone, tetrahydrofuran, isopropyl alcohol and the like, and that solvents of this sort can be substituted in certain instances. The proportion of organic component in such aqueous media is governed primarily by its effect on the solubility of the various components of the reaction mixtures, and the quantity of organic component usually will not exceed the volume of water employed.

Concentrations of the cobalt-zinc salt solutions, $BH_4^-$ solutions, and amine-borane solutions may range up to the limiting solubilities of the compounds in water. Use of concentrated solutions of cobalt salts is preferred for reasons of economy. One molar $NaBH_4$ is convenient for use.

When reaction is effected batchwise, reaction mixtures are preferably agitated, e.g., by manual or magnetic stirring. In the "merging stream" reactor, impingement of solutions of the reactants affords adequate agitation though, if desired, the resulting slurry may be agitated in the receiver into which it drops. Both batch-wise and constant environment reactions may be carried out, if desired, under a blanket of inert gas, e.g., argon or nitrogen.

In batch reactions it is preferred to add borohydride solutions to cobalt-zinc salt solutions to avoid catalytic decomposition of unconsumed borohydride. This problem is not encountered in the "merging stream" reactor.

It has been calculated by M. McCaig, Cobalt 31, 83 (1966), that the coercivity of single domain, hexagonal close-packed cobalt should be approximately 1440 oersteds. Obviously the particles of this invention do not consist entirely of single domain particles of hcp cobalt. However, the erase curves plotted in the figure show that a substantial percentage of particles precipitated in the "merging stream" reactor and heat-treated in hydrogen have coercivities that approach that of single-domain hcp cobalt. The erase curves were determined by a method related to that used by E. Kneller, Handbook der Physik, vol. 18–2, pp. 438–544, Springer-Verlag, Berlin, 1966, in studying coercivity distribution and magnetic particle interaction. That is, a sample was first saturated in a constant magnetic field of 4,400 oersteds and the remanence, $\sigma_r$, was measured. The sample was then soaked in an A.C. magnetic field for about 1 second after which the remanence was remeasured. The A.C. field, $H_{a.c.}$ was then increased in 100 oersted intervals so that the data consist of a series of D.C. remanence measurements obtained after soaking in progressively larger A.C. fields at 60 cycles per second up to a maximum of 1700–2000 oersteds. The data in the figure are plotted with $\Delta\sigma_r/\Delta H_{a.c.}$ (that is, decrease of remanence in emu/gram/100 oersteds increase in A.C. field) as the ordinate and with $H_{a.c.}$ as the abscissa. The quantity $\Delta\sigma_r/H_{a.c.}$ is proportional to the amount of magnetic material in the sample which has an intrinsic coercive force between $H_{a.c.}$ and $H_{a.c.}+\Delta H_{a.c.}$. Thus, the differential plot provides an approximate coercivity profile.

Curve 2 of the figure shows that particles precipitated in Example 6 in the "merging stream" reactor in the presence of zinc chloride and subsequently heat-treated for 4 hours in hydrogen at 300° C. have a higher coercivity and a much narrower coercivity distribution than similar heat-treated particles precipitated batchwise in Example 1 in the presence of zinc chloride Curve 1. Comparison with Curves 3 and 4 show the lower coercivity and broader coercivity distribution of particles precipitated in the "merging stream" reactor by the method of Example 8 but in the absence of zinc, Curve 3, and the extremely broad coercivity distribution for the same particles after they had been calcined at 450° C. rather than at 350° C., Curve 4. For many magnetic applications, high coercivity and narrow coercivity distribution are highly desirable.

The ratio of hcp-cobalt to total crystalline cobalt in Co-Zn-B alloy powders may be estimated from a formula developed for pure cobalt by M. Stage and Ch. Guillaud, Revue de Metallurgie 47, No. 2, 139 (1950). The formula takes into consideration both structural and multiplicity factors and when solved for weight percent hcp cobalt gives:

Weight percent hcp cobalt $$= \left( \frac{I_{\{10\bar{1}1\}\text{hcp}}}{I_{\{10\bar{1}1\}\text{hcp}} + (1.5)\, I_{\{200\}\text{fcc}}} \right) 100$$

where the I's are the integrated X-ray intensities of the indicated diffraction peaks from the fcc and the hcp cobalt phases. Integrated intensities were determined from X-ray diffractometer patterns taken with Fe-filter, $CoK_\alpha$ radiation. Results tend to underestimate the weight percent of hcp phase because the {200} fcc diffraction peak is severely overlapped by the high angle tail of the $\{10\bar{1}1\}$ hcp peak. When this method was used to estimate the hcp cobalt content of the total cobalt in cobalt-zinc-boron precipitated as described in Example 10–D and heat treated in hydrogen for four hours at 300° C. and 325° C., respectively, and passivated in argon containing 3% oxygen, the results were:

| Temperature of heat treatment, ° C.: | Estimated wt. of percent of hcp cobalt |
|---|---|
| 300 | 80 |
| 325 | 73 |

The magnetic properties of the products of this invention may be determined by conventional methods. Of chief importance are the intrinsic coercive force ($H_{ci}$) expressed in oersteds, the saturation magnetization ($\sigma_s$) expressed in emu/g. (or its equivalent gauss-cm.$^3$/g.) as determined in a 4400-gauss field, and the remanence or retentivity of magnetization ($\sigma_r$) after removal of the field expressed in emu/g. The sigma values employed herein are defined on pp. 5–8 of Bozorth's "Ferromagnetism," D. Van Nostrand Co., New York (1951). These sigma values are determined in fields of 4400 oersteds on apparatus similar to that described by T. R. Bardell on pp. 226–228 of "Magnetic Materials in the Electrical Industry," Philosophical Library, New York (1955). The definition of intrinsic coercive force is given in Special Technical Publication No. 85 of the American Society for Testing Materials entitled "Symposium on Magnetic Testing" (1948), pp. 191–198. The values for the intrinsic coercive force given herein are determined on a DC ballistic-type apparatus which is a modified form of the apparatus described by Davis and Hartenheim in the Review of Scientific Instruments 7, 147 (1936).

SPECIFIC EMBODIMENTS OF THE INVENTION

The examples which follow are intended to illustrate but not to limit the scope of this invention. All parts and percentages are by weight unless otherwise stated.

Examples 1–5

Analyses, yields, compositions, and magnetic properties of ferromagnetic powders precipitated in a control experiment and in Examples 1–5 by batchwise addition of sodium borohydride to cobalt chloride solutions containing the specified quantities of zinc chloride are shown in Table I. In each experiment a solution of 3.8 g. of sodium borohydride in 100 ml. of water was added with manual stirring to 200 ml. of an aqueous solution of 47.6 g. of $CoCl_2 \cdot 6H_2O$ and the specified quantity of $ZnCl_2$ contained in a glass beaker resting on the poles of a 1500-gauss horseshoe magnet.

Temperature rose from ambient to about 35° C. during the addition. After 15 minutes, precipitated black powder was separated by filtration, washed with water (500 ml.) and with acetone (500 ml.), aged overnight in acetone (125 ml.), again separated by filtration, and dried in air.

The designation "ACP" in Table I denotes "as chemically precipitated," i.e., non-heat-treated particles. The designation "HT" designates the same particles after they had been heat treated for four hours in hydrogen at 300° C. and passivated in argon containing a little oxygen.

TABLE I

Preparation of Co—Zn—B by batchwise addition of $NaBH_4$ to $CoCl_2/ZnCl_2$

| Example No. | Grams of $ZnCl_2$ used | Product yield (grams) | Product composition,* percent | | | Magnetic properties | | | | | | | |
|---|---|---|---|---|---|---|---|---|---|---|---|---|---|
| | | | | | | $H_{ci}$ | | $\sigma_s$ | | $\sigma_r$ | | $\sigma_r/\sigma_s$ | |
| | | | Co | Zn | B | ACP | HT | ACP | HT | ACP | HT | ACP | HT |
| Control A | 0 | 5.7 | 78.83 | None | 5.78 | 105 | 310 | 39 | 75 | 14 | 30 | 0.358 | 0.400 |
| 1 | 2 | 3.9 | 78.82 | 3.69 | 3.46 | 405 | 685 | 75 | 101 | 35 | 45 | 0.466 | 0.445 |
| 2 | 4 | 5.4 | 71.16 | 7.06 | 3.06 | 365 | 490 | 70 | 93 | 25 | 35 | 0.357 | 0.376 |
| 3 | 6 | 3.5 | 80.68 | 2.90 | 3.44 | 400 | ------- | 60 | ------- | 26 | ------- | 0.453 | ------- |
| 4 | 8 | 3.7 | 82.00 | 2.84 | 3.11 | 385 | ------- | 63 | ------- | 26 | ------- | 0.412 | ------- |
| 5 | 10 | 3.1 | 84.80 | 2.42 | 2.33 | 405 | ------- | 77 | ------- | 30 | ------- | 0.389 | ------- |

*Before heat treatment. The balance of the products is believed to be chemically combined oxygen and adsorbed water.

The data show that presence of $Zn^{2+}$ resulted in lower boron content in the precipitated particles and in considerably higher $H_{ci}$, $\sigma_s$, and $\sigma_r$. Heat treatment raised $H_{ci}$, $\sigma_s$, and $\sigma_r$ appreciably. The products of Examples 1, 4, and 5 ranged from about 0.02 to 0.08 micron in size. The product of Example 1 was amorphous by X-ray diffraction "as chemically precipitated," but after heat treatment, it contained hexagonal close-packed cobalt as a principal phase with face-centered cubic cobalt as a minor phase.

Examples 6–9

Examples 6–9, Table II, show that cobalt-zinc-boron powders with magnetic properties superior to those of batch-precipitated products are obtained by carrying out the reductive precipitation in a "merging stream" reactor. In this reactor, an aqueous solution of $NaBH_4$ and an aqueous solution of cobalt and zinc salts were forced from calibrated reservoirs through small diameter (capillary) tubes located close together but at a slight angle to each other so that the streams ejected from the capillaries impinged, reacted at once, and merged into a single stream which fell through a surrounding glass tube into a receiver located about two feet below the point of impingement. In Experiments 6, 7 and 8, a magnetic field of about 1500 gauss was located around and immediately below the point of impingement. No magnetic field was used in Example 9. Reaction was virtually instantaneous when the streams met. The zinc salt used in each case was zinc chloride.

The reservoirs (1-liter graduated glass cylinders) were equipped at the top with means for pressuring with nitrogen and at the bottom with metering valves for controlling flow rates. One of the reservoirs designated as "A" in Table II contained a solution of 238 g. of the specified cobalt salt and 10 g. of $ZnCl_2$ in one liter of water. The other reservoir contained a solution of 19 g. of $NaBH_4$ in 500 ml. of water. The rate of flow of solution "A" was twice that of the borohydride solution. Total time of addition was five minutes. Reactants were at room temperature. A driving force of about 12 inches of mercury was required to push the solutions through the 2 mm. I.D. capillary tubes. Air was displaced from both the reaction zones and the product receivers by nitrogen though this blanketing with inert gas was probably not essential. The black powders formed by reaction were separated by filtration, washed with water, then with acetone, suspended overnight in 500 ml. of quantities of acetone, and finally separated again and dried in air.

As shown in Table II very large increases in coercivity and substantial increases in saturation magnetization, remanence, and remanence ratio resulted from heat treating the reaction products in hydrogen for about four hours at an optimum temperature of about 325° C. (in all cases the heat treatment was followed by a passivation treatment at room temperature in argon containing 3% oxygen).

Crystal structure was determined by X-ray powder camera diffraction patterns taken with filtered cobalt $K_\alpha$ radiation. Before heat treatment the product of Example 6 was amorphous to X-rays, the diffraction pattern consisting of a single broad line (electron diffraction indicated the hcp cobal was present). Hcp cobalt was the principal phase with a minor phase of fcc cobalt in products heat-treated at 275–325° C. Treatment at 350° C. and above resulted in significant increase in detectable fcc cobalt.

The equiaxed particles produced in Examples 6, 7, and 9 that had not been heat-treated had widths in the ranges of 0.01–0.03 micron, and 0.02–0.03 micron, respectively. After heat-treatment in hydrogen for four hours at 300° C., particles of Example 6 were unchanged in size. Heat-treatment at 400° C., however, resulted in some sintering and an increase in width of some particles to 0.2 micron.

Advantages in precipitating cobalt-boron particles in the presence of $Zn^{2+}$ may be seen by comparing the data in Table II with that in Table III. Table III lists the properties of cobalt-boron particles precipitated in a "merging stream" reactor using the reactants of Example 8 but in the absence of $Zn^{2+}$. These zinc-free particles were equiaxed and approximately the same size as those precipitated in the presence of $Zn^{2+}$. It will be noted, however, that they had a much higher boron content and significantly lower coercivity, saturation magnetization, remanence, and remanence ratio.

TABLE III

Control—"merging stream" reactor—no zinc salt used

| | Magnetic properties | | | | Structure by X-ray diffraction | |
|---|---|---|---|---|---|---|
| | $H_{ci}$ | $\sigma_s$ | $\sigma_r$ | $\sigma_r/\sigma_s$ | Principal phase | Other phase |
| Not heat treated; as precipitated. | 51 | 32.0 | 9.3 | 0.29 | Amorphous | |
| Heat treated in hydrogen for 4 hours at ° C. shown: | | | | | | |
| 300 | 368 | 60.5 | 26.6 | 0.44 | Hcp Co | |
| 350 | 420 | 67.5 | 30.1 | 0.45 | Hcp Co | |
| 400 | 467 | 96.3 | 35.9 | 0.37 | Hcp Co | $Co_3B$, fcc Co |
| 450 | 649 | 82.1 | 30.6 | 0.37 | $Co_3B$ | Fcc Co, hcp Co |

NOTE.—Composition of the "as chemically precipitated" particles: Co, 75.9%; B, 7.4%; O, 14.2%.

Example 10

This example illustrates the advantage of using a "merging stream" reactor, i.e., constant environment precipitation, rather than batch precipitation. The results of

TABLE II.—"MERGING STREAM" REACTIONS

| | Example | | | |
|---|---|---|---|---|
| | 6 | 7 | 8 | 9 |
| Cobalt salt used in reservoir "A" | $CoCl_2 \cdot 6H_2O$ | $CoCl_2 \cdot 6H_2O$ | $CoSO_4 \cdot 7H_2O$ | $CoCl_2 \cdot 6H_2O$ |
| Product yield in grams | 17.4 | 18.0 | 16.0 | 16.0 |
| Analysis of product (before heat treatment) percent: | | | | |
| Co | 75.19 | 76.12 | 76.09 | 78.26 |
| Zn | 5.57 | 3.31 | 5.30 | 7.76 |
| B | 3.36 | 2.65 | 3.58 | 4.10 |
| Total oxygen | | 15.56 | | |
| $H_2O$ | | 1.4 | | |
| Coercivity, $H_{ci}$ (before heat treatment) | 335 | 336 | 337 | 318 |
| Coercivity, $H_{ci}$ (after treatment at ° C. shown): [1] | | | | |
| 250 | 820 | | | |
| 275 | 860 | | | |
| 300 | 870 | 884 | | 832 |
| 325 | 910 | 890 | 774 | |
| 350 | 840 | 926 | | 903 |
| 375 | | | | 896 |
| 400 | 760 | | | 455 |
| $\sigma$ (before heat treatment) | 68.6 | 65.6 | 74.4 | 70.9 |
| $\sigma$ (after treatment at ° C. shown): [1] | | | | |
| 250 | 100.3 | | | |
| 275 | 101.7 | | | |
| 300 | 104.4 | 98.7 | | 100.8 |
| 325 | 115.5 | 100.8 | 95.8 | |
| 350 | 122.5 | 115.8 | | 107.9 |
| 375 | | | | 105.2 |
| 400 | 113.7 | | | 113.5 |
| $\sigma_r$ (before heat treatment) | 30.7 | 29.5 | 33.0 | 31.8 |
| $\sigma_r$ (after treatment at ° C. shown): [1] | | | | |
| 250 | 50.7 | | | |
| 275 | 51.7 | | | |
| 300 | 52.0 | 50.7 | | 52.1 |
| 325 | 54.5 | 50.2 | 48.5 | |
| 350 | 51.6 | 54.3 | | 55.2 |
| 375 | | | | 52.5 |
| 400 | 47.7 | | | 38.5 |
| $\sigma_r/\sigma_s$ (before heat treatment) | 0.450 | 0.450 | 0.444 | 0.449 |
| $\sigma_r/\sigma_s$ (after treatment at ° C. shown): [1] | | | | |
| 250 | 0.505 | | | |
| 275 | 0.508 | | | |
| 300 | 0.498 | 0.513 | | .517 |
| 325 | 0.472 | 0.465 | 0.506 | |
| 350 | 0.421 | 0.468 | | 0.512 |
| 375 | | | | 0.500 |
| 400 | 0.419 | | | 0.338 |
| Principal (p) and minor phases (m) by X-ray diffraction after treatment at ° C. shown: [1] | | | | |
| None | Amorphou [2] | | | |
| 275 | Hcp(p); fcc(m) | | | |
| 300 | Hcp(p); fcc(m) | | | |
| 325 | Hcp(p); fcc(m) | | | |
| 350 | Hcp + fcc (p) | | | |
| 400 | Hcp + fcc (p) | | | |

[1] All heat treatments involved four hours in flowing hydrogen at the temperature shown followed by passivation at room temperature in argon containing 3% oxygen by volume.

[2] Hexagonal close-packed cobalt was detected by electron diffraction.

three batch precipitations (in the presence of a magnetic field) are compared with the results of three "merging stream" precipitations (the first two in a magnetic field and the third without). In all cases the magnetic field was the same and the reactants were used in the ratio:

Solution A: 3.8 g. of $NaBH_4$ in 100 ml. of water
Solution B: 47.6 g. of $CoCl_2 \cdot 6H_2O$ and 2 g. of $ZnCl_2$ in 200 ml. of water The cobalt, zinc and boron contents of the several products (balance: largely oxygen and water) were as follows:

| | Percent | | | Precipitation in magnetic field |
|---|---|---|---|---|
| | Co | Zn | B | |
| Batch run: | | | | |
| A | 78.80 | 3.7 | 3.5 | Yes. |
| B | 70.50 | 2.3 | 5.5 | Yes. |
| C | 75.8 | 2.9 | 5.6 | Yes. |
| "Merging Stream" run: | | | | |
| D | 75.2 | 5.6 | 3.4 | Yes. |
| E | 76.1 | 3.3 | 2.65 | Yes. |
| F | 78.3 | 7.8 | 4.1 | No. |

Composition of the "merging stream" products was more nearly constant than that of the batch precipitated products.

Another advantage in "merging stream" precipitation, as shown in Table IV, is superior uniformity and higher coercivity, saturation magnetization, remanence, and remanence ratio.

TABLE IV

| Method of preparation | Magnetic properties | | | | | | | |
|---|---|---|---|---|---|---|---|---|
| | As chemically prepared | | | | After heat treatment [1] | | | |
| | $H_{ci}$ | $\sigma_s$ | $\sigma_r$ | $\sigma_r/\sigma_s$ | $H_{ci}$ | $\sigma_s$ | $\sigma_r$ | $\sigma_r/\sigma_s$ |
| Batch run: | | | | | | | | |
| A | 405 | 75 | 36 | 0.48 | 685 | 101 | 46 | 0.455 |
| B | 215 | 34 | 17 | 0.395 | 640 | 80 | 37 | 0.46 |
| C | 230 | 49 | 20 | 0.41 | 544 | 86 | 38 | 0.44 |
| "Merging stream" run: | | | | | | | | |
| D | 335 | 69 | 31 | 0.45 | 910 | 115.5 | 51 | 0.47 |
| E | 336 | 66 | 29.5 | 0.45 | 890 | 101 | 50 | 0.465 |
| F | 318 | 71 | 32 | 0.45 | 903 | 108 | 55 | 0.51 |

[1] Except in Run F in which temperature was 350° C., at 325° C. in hydrogen for four hours followed by passivation at room temperature in argon containing 3% oxygen.

Batch-precipitated cobalt-zinc-boron particles appear to be more temperature sensitive at 350–400° C. than "merging stream" reactor products. Preliminary heat treatment for four hours in hydrogen at 275–300° C. resulted in less loss of coercivity when products were ultimately heated at higher temperature.

Batch-precipitated products were roughly equiaxial and approximately 0.02–0.07 micron in size. A few particles appeared to be joined together in short, bead-like chains. "Merging stream" products consisted principally of equiaxed particles about 0.01 to 0.03 micron in size. Thus, the particles were somewhat smaller and more uniform in size than the batch process products. Phases detected by X-ray diffraction were as follows:

| Method of preparation | Principal phase | Other phases |
|---|---|---|
| Batch process: | | |
| As chemically precipitated | Amorphous to X-rays | |
| Heat treated at: | | |
| 300° C.[1] | Hcp Co | Fcc Co |
| 400° C.[1] | Hcp + fcc Co | $Co_3B$, $Co_2B$ |
| "Merging Stream" process: | | |
| As chemically precipitated | Amorphous to X-rays [2] | |
| Heat treated at: | | |
| 275° C.[1] | Hcp Co | Fcc Co |
| 325° C.[1] | Hcp Co | Fcc Co [3] |
| 350° C.[1] | Hcp + fcc Co | [3] |
| 400° C.[1] | Hcp + fcc Co | [3] |

[1] In hydrogen, followed by passivation in argon containing oxygen.
[2] Hcp cobalt was detected by electron diffraction.
[3] Lines from unidentified material were also detected.

Example A

A permanent magnet was prepared from a composite of the cobalt-zinc-boron powders produced in Examples 6, 7, and 9. Each of the powders had been heat treated in hydrogen at 300° C. for four hours and passivated by overnight exposure to flowing argon containing 3% oxygen. The combined powders (0.75 g.) were compacted at 60 tons per square inch pressure at room temperature in a 13,200-oersted magnetic field in a 1.5 x 0.1-inch mold. The resulting bar was a permanent magnet with an intrinsic coercivity of 603 oersteds, a saturation magnetization of 84.4 emu/g. a remanence of 52.6 emu/g. and a remanence ratio of 0.625. Products of the invention are also useful as the magnetic ingredient of magnetic recording tapes.

Since obvious modifications or equivalents of the invention will be evident to those skilled in the art, we propose to be bound solely by the appended claims.

The embodiments of the invention in which an exclusive property or privilege is claimed are defined as follows:

1. Approximately equiaxed ferromagnetic particles about 0.01 to 0.1 micron in size consisting essentially of (1) cobalt, zinc, and boron in 70–92 to 1–8 to 1–5.6 ratio by weight and (2) up to 22% by weight of chemically combined oxygen and adsorbed water.

2. The ferromagnetic particles of claim 1 in which the proportions by weight of cobalt, zinc and boron are 87–92 to 1–1.5 to 1–4 respectively.

3. The ferromagnetic particles of claim 1 containing at least 60% of the cobalt in hexagonal close-packed crystal form.

4. The ferromagnetic particles of claim 2 containing at least 60% of the cobalt in hexagonal close-packed crystal form.

5. The ferromagnetic particles of claim 1 which are 0.02 to 0.08 micron in size.

6. The ferromagnetic particles of claim 1 which are 0.01 to 0.03 micron in size.

7. A method for making equiaxed ferromagnetic particles about 0.01 to 0.1 micron in size comprising reacting a mixture of cobaltous and zinc salts with a reducing agent selected from the group consisting of (a) Group I–A metal borohydrides,
(b) Group II–A metal borohydrides,
(c) tetraloweralkylammonium borohydrides, and
(d) a mixture of an amine-borane with up to 20% by weight of (a), (b), or (c), and recovering the formed particles.

8. The method of claim 7 wherein a solution of the reducing agent is added to a solution containing the cobaltous and zinc salts.

9. The method of claim 8 wherein the solutions are brought together in merging streams.

10. The method of claim 7 wherein the amine-borane component of (d) is present in a solution of either or both of the cobaltous and zinc salts.

11. The method of claim 7 wherein the recovered particles are heated in hydrogen at 250–400° C. for a time sufficient to increase their coercivity, saturation magnetization, remanence and remanence ratio.

12. The method of claim 11 wherein the temperature is 300–325° C.

13. The method of claim 11 wherein the recovered particles are exposed to an inert atmosphere containing 1–3% oxygen for a time sufficient to lessen their sensitivity to oxygen.

14. The method of claim 7 using cobaltous chloride.

15. The method of claim 7 using cobaltous sulfate.

16. The method of claim 7 using zinc chloride.

17. The method of claim 7 using sodium borohydride.

References Cited

UNITED STATES PATENTS

| | | | |
|---|---|---|---|
| 3,206,338 | 9/1965 | Miller et al. | 148—105 |
| 3,535,104 | 10/1970 | Little, Jr., et al. | 75—0.5 AA |
| 3,567,525 | 3/1971 | Graham et al. | 148—105 X |
| 3,607,218 | 9/1971 | Akashi et al. | 75—0.5 AA |

OTHER REFERENCES

Stadelmaier et al., Metall. 17, pp. 781–782 (1963).

L. DEWAYNE RUTLEDGE, Primary Examiner

G. K. WHITE, Assistant Examiner

U.S. Cl. X.R.

75—108, 119, 170; 148—105, 31.55